United States Patent
Haimerl (10) Patent No.: US 10,875,389 B2
(45) Date of Patent: Dec. 29, 2020

(54) TOP ARRANGEMENT HAVING A TOP COVER

(71) Applicant: Webasto SE, Stockdorf (DE)

(72) Inventor: Alexander Haimerl, Stockdorf (DE)

(73) Assignee: WEBASTO SE, Stockdorf (DE)

(*) Notice: Subject to any disclaimer, the term of this patent is extended or adjusted under 35 U.S.C. 154(b) by 48 days.

(21) Appl. No.: 16/193,835

(22) Filed: Nov. 16, 2018

(65) Prior Publication Data
US 2019/0160926 A1 May 30, 2019

(30) Foreign Application Priority Data

Nov. 29, 2017 (DE) .......................... 10 2017 128 302
Jul. 19, 2018 (DE) .......................... 10 2018 117 486

(51) Int. Cl.
| B60J 7/06 | (2006.01) |
| B60J 7/14 | (2006.01) |
| B60J 7/04 | (2006.01) |

(52) U.S. Cl.
CPC .................. *B60J 7/061* (2013.01); *B60J 7/04* (2013.01); *B60J 7/064* (2013.01); *B60J 7/146* (2013.01)

(58) Field of Classification Search
CPC ... B60J 7/146; B60J 7/061; B60J 7/064; B60J 7/04
USPC ...... 296/107.15, 107.19, 107.2, 219, 220.01, 296/216.03, 216.05
See application file for complete search history.

(56) References Cited

U.S. PATENT DOCUMENTS

| 4,066,292 A * | 1/1978 | Carli ........................ B60J 7/106 296/219 |
| 4,893,868 A * | 1/1990 | Miller ...................... B60J 7/061 296/219 |
| 4,898,420 A * | 2/1990 | Takada ................... B60J 7/1291 296/219 |
| 5,897,160 A * | 4/1999 | Reihl ....................... B60J 7/047 296/220.01 |
| 7,651,152 B2 * | 1/2010 | Beierl .................... B60J 7/1265 296/107.07 |
| 10,065,486 B2 * | 9/2018 | Smith .................... B60J 7/1291 |
| 2018/0022194 A1 * | 1/2018 | Holzel ....................... B60J 7/19 296/216.05 |
| 2018/0297456 A1 * | 10/2018 | Stickles ................... B60J 10/70 |
| 2019/0176597 A1 * | 6/2019 | Haimerl ................... B60J 1/007 |

FOREIGN PATENT DOCUMENTS

| CA | 2981671 A1 * | 4/2018 | ............ B60J 7/061 |
| EP | 2977247 A1 * | 1/2016 | ............ B60J 7/146 |
| EP | 2995485 A1 * | 3/2016 | ............ B60J 7/061 |

* cited by examiner

*Primary Examiner* — Jason S Morrow

(74) *Attorney, Agent, or Firm* — Fitch, Even, Tabin & Flannery, LLP

(57) ABSTRACT

A top arrangement of a motor vehicle having a hard-top or folding-top section and a top cutout which borders the hard-top or folding-top section and which can be either closed or at least partially opened by means of a top opening system comprising at least one displaceable lid element, which can be shifted over the hard-top or folding-top section, and a top cover, which spans at least the hard-top or folding-top section in a closed position of the top opening system and is fixed to the lid element across its entire width.

15 Claims, 8 Drawing Sheets

TOP ARRANGEMENT HAVING A TOP COVER

CROSS-REFERENCE TO RELATED APPLICATIONS

This application claims priority from German Patent Application Number DE 10 2017 128 302.1, filed Nov. 29, 2017, and German Patent Application Number DE 10 2018 117 486.1, filed Jul. 19, 2018, which are hereby incorporated herein by reference in their entirety for all purposes.

FIELD

The invention relates to a top arrangement of a motor vehicle, comprising a top cutout which can either be closed or at least partially opened by means of a top opening system.

BACKGROUND

Such a top arrangement is known from practice and is designed in particular as a folding top, in which a top cover made of foldable weatherproof textile material can be shifted between a closed position, in which a top cutout is covered, and an opened position, in which the top cutout is opened and the top cover is disposed in a folded state in a rear area of the respective top. To fold the top cover in a specific manner, the top opening system is provided with bows which extend outward when displacing the top in the opened position and thus predefine the folding lines of the top cover. The bows are guided in lateral guide tracks of the top opening system via sliders. Moreover, the known top opening system comprises a front bow which defines a front edge area of the top cover.

Furthermore, it is known to provide such a folding top with a rearward cassette in which a drive unit for the top cover is accommodated and which can be displaced between a raised position and a storage position by means of a rear kinematics, said cassette being accommodated in a rearward storage area of the respective motor vehicle together with the top cover, the bow and the front bow when in said storage position.

The bows of the above-described folding tops are formed by tubular elements or rails which extend in the transverse direction of the vehicle. The outline of these tubular elements or rails can be traced on the outer side of the top cover when in its closed position.

SUMMARY

The objective of this invention is to create a top arrangement of the make mentioned above which provides a harmonic aesthetic when in the closed position.

According to the invention, this objective is attained by the top arrangement having the features of claim 1.

The top arrangement according to the invention therefore comprises a hard-top or folding-top section and a top cutout which borders the hard-top or folding-top section and can either be closed or at least partially opened by means of a top opening system. The top opening system comprises a displaceable lid element, which can be shifted over the hard-top or folding-top section, and a top cover, which spans at least the hard-top or folding-top section when in a closed position of the top opening system and is fixed to the displaceable lid element across its entire width.

The displaceable lid element, which can be formed by a glass panel or a closed structure, at least partially defines the shape of the top cover when in the closed position of the opening system since it is a flat element and can form an abutment and/or fixation surface in the make of a surface bow for the top cover. The shape or the progression of the top cover can therefore be influenced when in its closed position via the shape of the flat element or the lid element. In addition, an inner headlining may be omitted owing to an adequate selection and a suitable layout of the lid element, or an inner headlining or an inner headlining section can be directly integrated into the displaceable lid element.

In comparison to a generic folding top, the acoustics in the interior of the respective vehicle can be improved via the displaceable lid element as certain sound-absorbing materials can be used for the lid element. The displaceable lid element comprises, for example, a paper honeycomb structure accommodated between the glass-fiber-reinforced polyurethane layers, i.e. the displaceable lid element is realized as a composite component in this instance.

In a specific embodiment of the top arrangement according to the invention, in which the shape of the top cover is mostly predefined by the displaceable lid element, the top cover spans the displaceable lid element such that the displaceable lid element acts like a panel bow and defines the shape of the top cover in the area of the lid element.

In a further specific embodiment of the top arrangement according to the invention, two displaceable lid elements, which are disposed behind one another in the closed position of the top opening system and are both at least partially spanned by the top cover when in the closed position, are provided and each act like a panel bow.

In an alternative embodiment of the top arrangement according to the invention, two displaceable lid elements are provided, which are also disposed behind one another in the closed position of the top opening system and of which the lid element disposed at the front of the vehicle when in the closed position, i.e. the lid element disposed closest to the front top edge, is realized without any fixations to the top cover.

If a hard-top section bordering the top cutout, which can either be closed or at least partially opened by means of the lid element, is provided, then this hard-top section can be realized so that it can be lowered. In particular when opening the top section, the hard-top section is first lowered in this instance so that subsequently the at least one displaceable lid element, to which the top cover is fixed, can be moved over the hard-top section.

The displaceable lid element is preferably fixed to a multi joint mechanism which is mounted in a guide track fixed to the top and by means of which the displaceable lid can be extended outward or lifted so that it can be displaced over the hard-top or folding-top section.

Further advantages and advantageous embodiments of the subject matter of the invention can be derived from the description, the drawing and the claims.

Exemplary embodiments of a vehicle having a top arrangement according to the invention are illustrated in the drawing in a schematically simplified manner and are further explained in the following description. In the following,

DETAILED DESCRIPTION

In FIGS. 1 to 12, a vehicle construction 10 is illustrated comprising a vehicle body 12 provided with a top arrangement 14. As a synopsis of FIGS. 1 to 14 shows, the top arrangement 14 comprises an edge section 16, which is fixed to the vehicle and surrounds an essentially rectangular top opening 18 which can either be closed (FIG. 1), partially opened (FIG. 3) or mostly opened (FIG. 4) by means of a top opening system 20.

Figure 1:
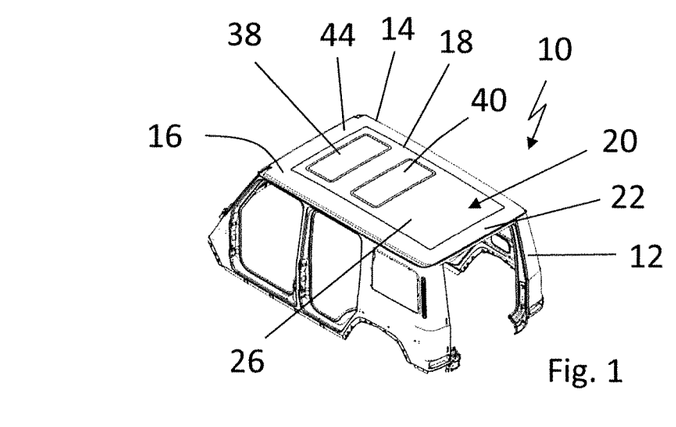
FIG. 1 illustrates a vehicle construction having a top arrangement laid out according to the invention.
Figure 2:
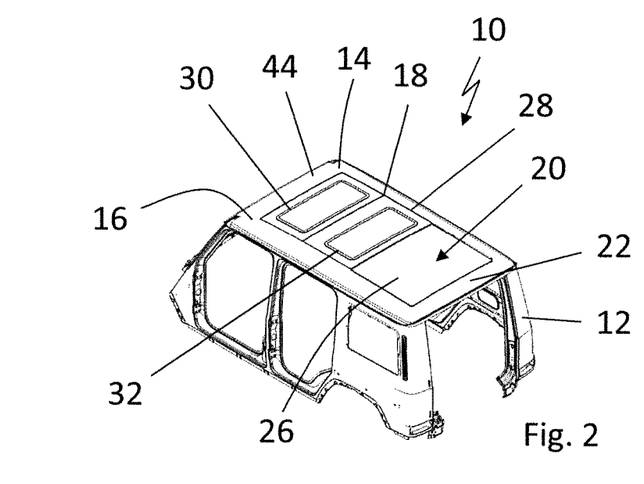
FIG. 2 illustrates a view of the vehicle construction according to FIG. 1 but without illustrating a top cover.
Figure 3:
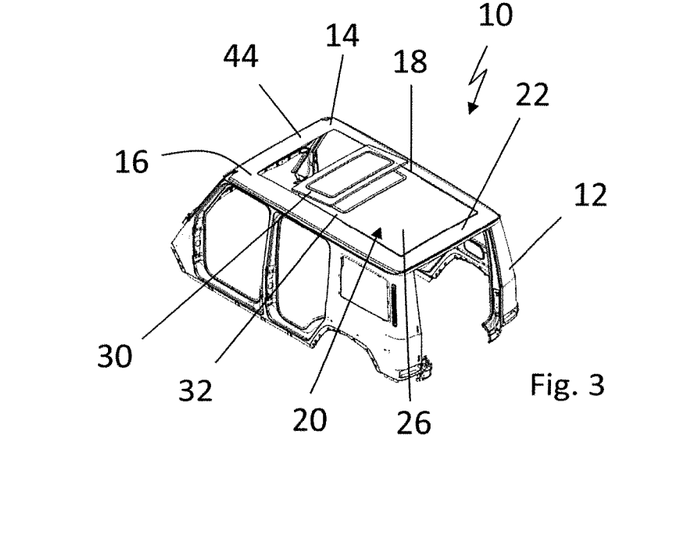
FIG. 3 illustrates a view of the vehicle construction according to FIG. 1 in a partially opened position of a top opening system.

Starting from a rearward wind cowl 22, which can be formed by a top cassette 24, the top arrangement 14 comprises a folding-top section 26 bordering on a top cutout 28, which is part of the top opening 18, at the front. The top cutout 28 can either be closed or opened by means of two lid elements 30 and 32 which are disposed behind one another in the longitudinal direction of the vehicle when in a closed position (FIG. 5) and each comprises a rigid frame 34 or 36 which surrounds a transparent area 38 or 40 formed by a glass pane. In the closed position, the front lid element 30 abuts against a front wind cowl 44 of the top arrangement 14 with its front edge. The frames 34 and 36 of the lid elements 30 and 32 are spanned by a top cover 32 which also forms the top cover of the folding-top section 26 and is formed by a foldable, weather-proof textile material.

Figures 7, 8, 9:
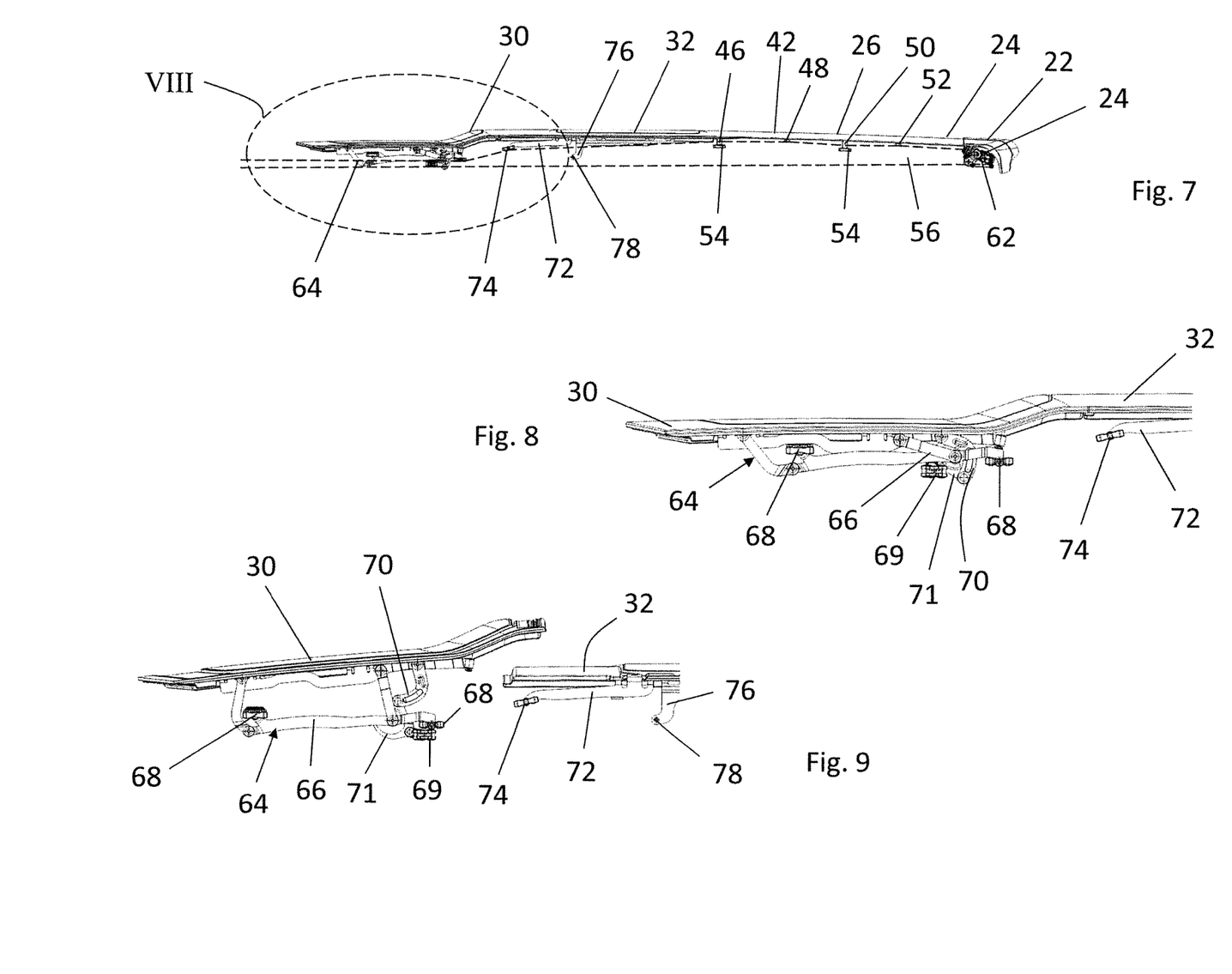
FIG. 7 illustrates a side view of the top opening system in its closed position.
FIG. 8 illustrates an enlarged view of the top opening system in the area VIII in FIG. 7.
FIG. 9 illustrates a view of the top opening system according to FIG. 8 but with the frontward lid element extended outward and without illustrating the top cover.

In addition to the top cover 42, as can be derived from FIGS. 7 to 12, the folding-top section 26 comprises four bows 46, 48, 50 and 52 which extend in the longitudinal direction of the top and via which the top cover 42 is spanned in the closed position. The bows 46 and 50 are guided via sliders 54 in guide tracks 56 disposed on each of its two sides relative to a vertical longitudinal center plane of the top. In FIG. 7, the guide track disposed on the left-hand side relative to the forward travel direction of the respective vehicle is illustrated in a dashed line. The bows 48 and 52 are connected to the bows 46 and 50, which are guided in the guide tracks 56, via outward-extension springs 58 and 60 and predefine a folding of the top cover 42 in the folding-top section 26 in the opened position of the top opening system 20.

The two lid elements 30 and 32 can be driven by means of a motor arrangement 62 which is accommodated in the top cassette 24. A first motor of the motor arrangement 62 serves for driving front lid element 30 and a second motor of the motor arrangement 62 serves for driving lid element 32.

Relative to the vertical longitudinal center plane of the top, the lid element 30 is provided on each of its two sides with drive kinematics 64 driven by the first motor via a drive cable and comprising a four-joint-arrangement 66 for raising and lowering the lid element 30, said four-joint arrangement 66 being guided in the respective guide track 56 in the longitudinal direction of the top via sliders 68 disposed at a base link. In addition, the drive kinematics 64 comprises an outward-extension lever arrangement 70, by means of which the four-joint arrangement 66 can be displaced and which is linked to the underside of the lid element 30.

Relative to the vertical longitudinal center plane of the top, the lid element 32, which is driven via a drive cable by means of the second motor of the motor arrangement 62, comprises on its underside on each of its two sides a rigidly fixed pivot arm 72, which is guided in a slotted link (not further illustrated) of the guide track 56 via a slider 74, and a support arm 76, which defines a pivot axis of the lid element 32 in the area of the guide track 56 with its slider 78, said pivot axis becoming shifted when displacing the lid element in the longitudinal direction of the vehicle. The pivot movement is initiated by means of the pivot arm 72 when displacing the lid element 32.

The top arrangement 14 is opened by means of the top opening system 20 in the manner described below.

Figure 4:
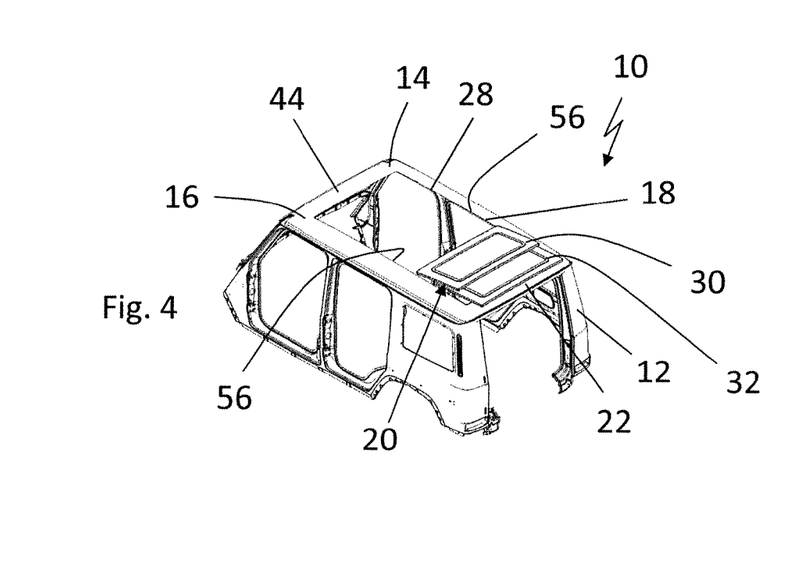
FIG. 4 also illustrates a view of the vehicle construction according to FIG. 1 but in a completely opened position of the top opening system.
Figure 5:
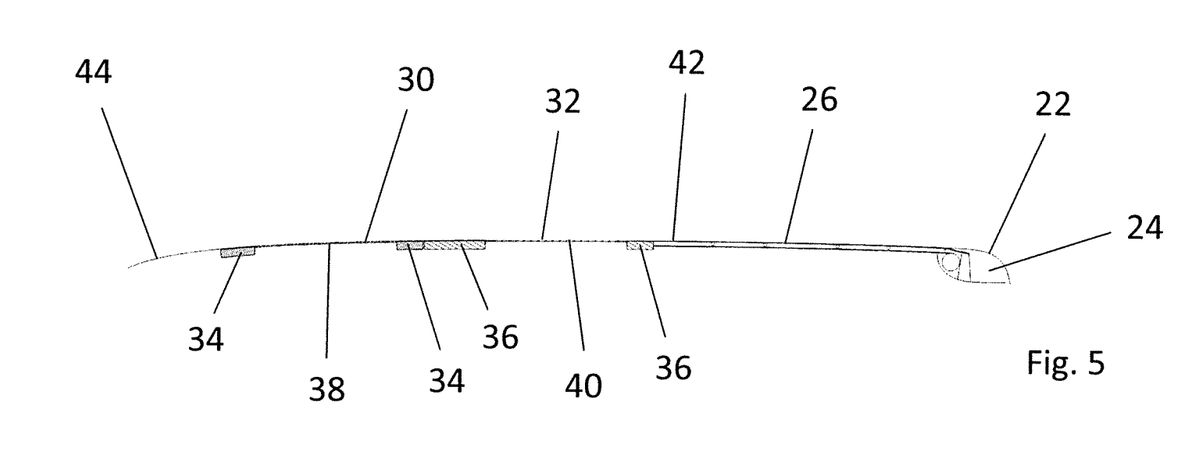
FIG. 5 illustrates a schematic longitudinal sectional view through the vehicle top in the closed position of the top opening system.
Figure 6:
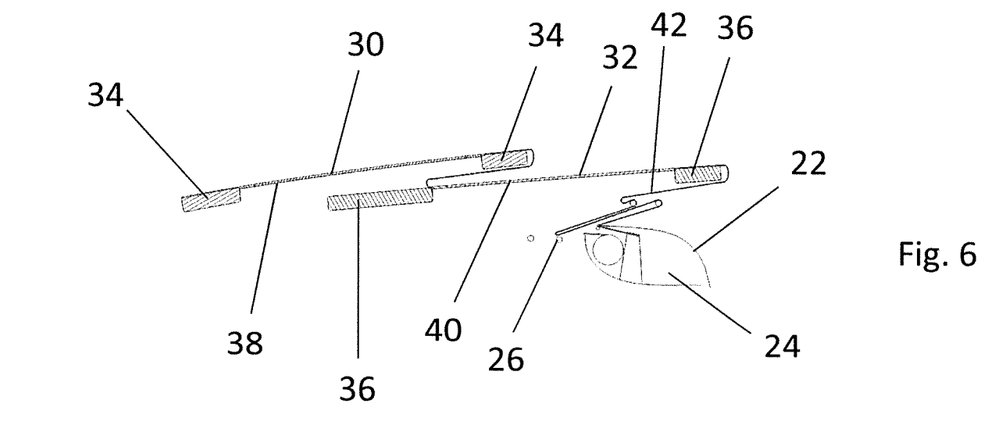
FIG. 6 illustrates a schematic longitudinal sectional view through the vehicle top in the completely opened position of the top opening system.
Figures 10, 11, 12:
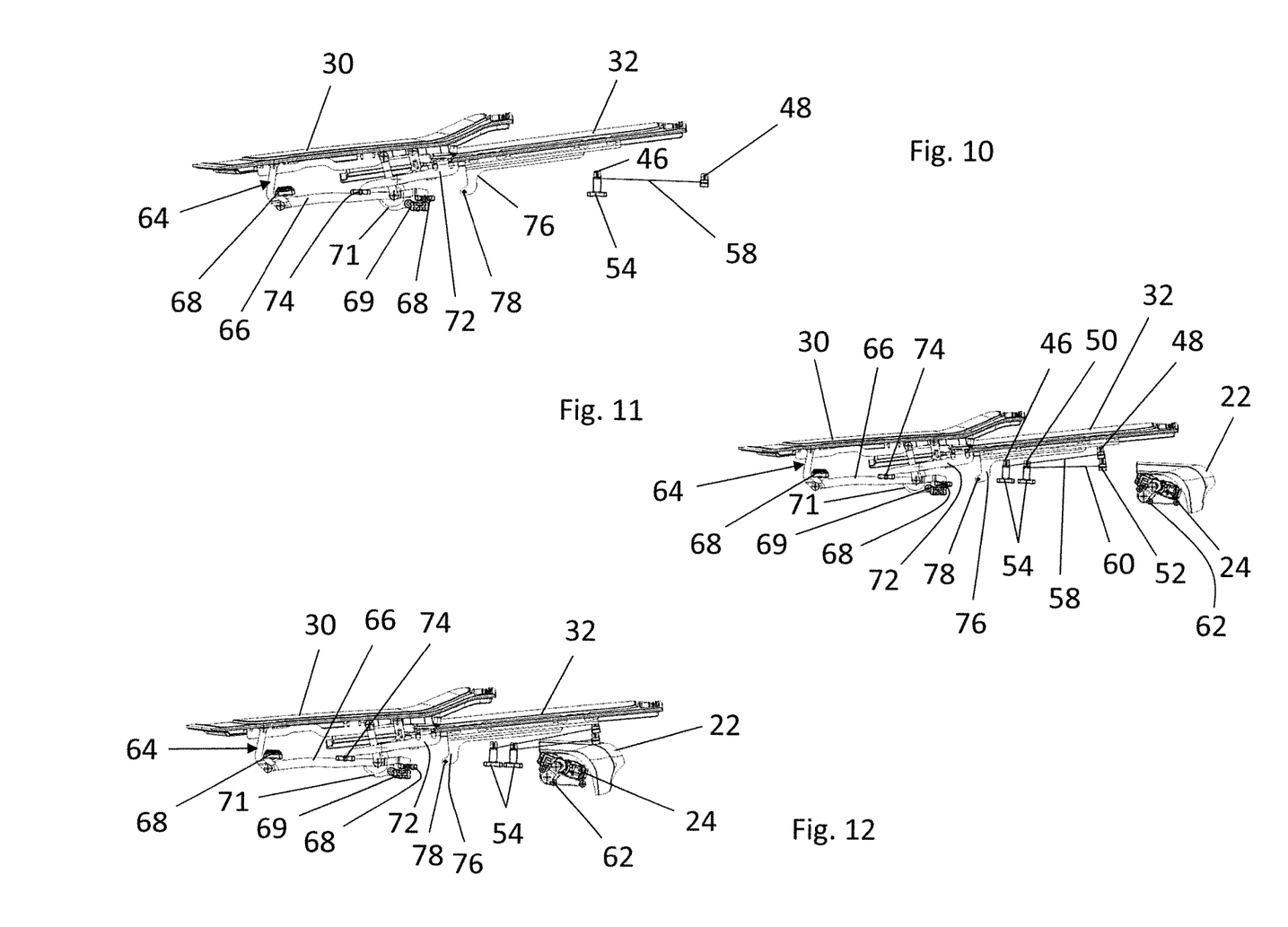
FIG. 10 illustrates a view of the top opening system according to FIG. 7 when in a partially opened position without illustrating the top cover.
FIG. 11 also illustrates a view of the top opening system according to FIG. 7 but in a second partially opened position without illustrating the top cover.
FIG. 12 also illustrates a view of the top opening system according FIG. 7 but in the completely opened position and without illustrating the top cover.
Figure 13:
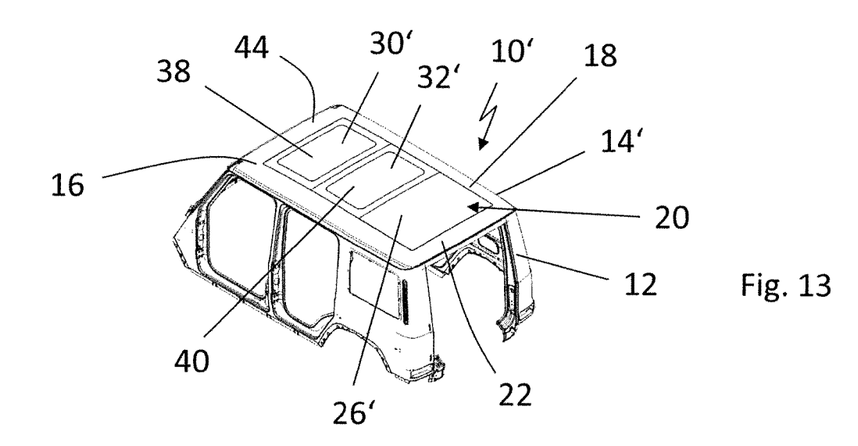
FIG. 13 illustrates a perspective top view of a vehicle construction having an alternatively realized top arrangement according to the invention in a closed position of a top opening system.
Figure 14:
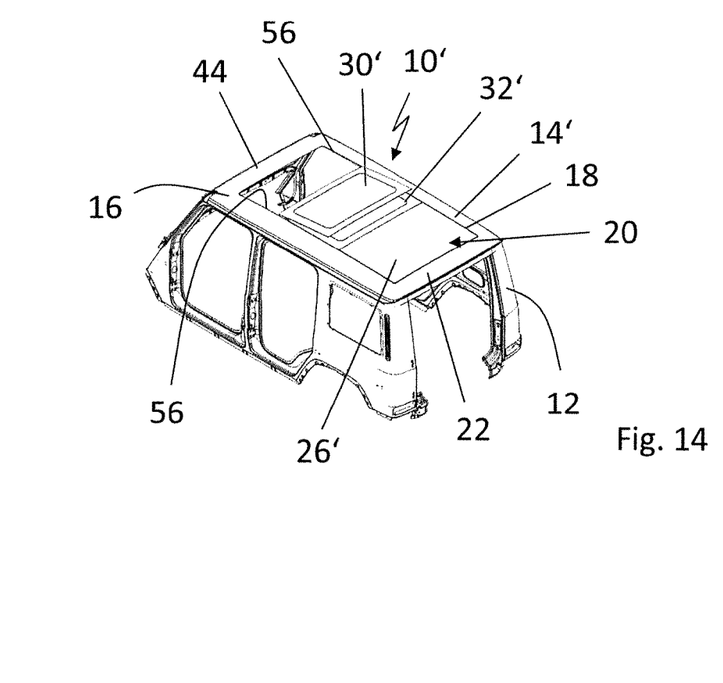
FIG. 14 illustrates a view of the vehicle construction according to FIG. 13 but in a partially opened position of the top opening system.
Figure 15:
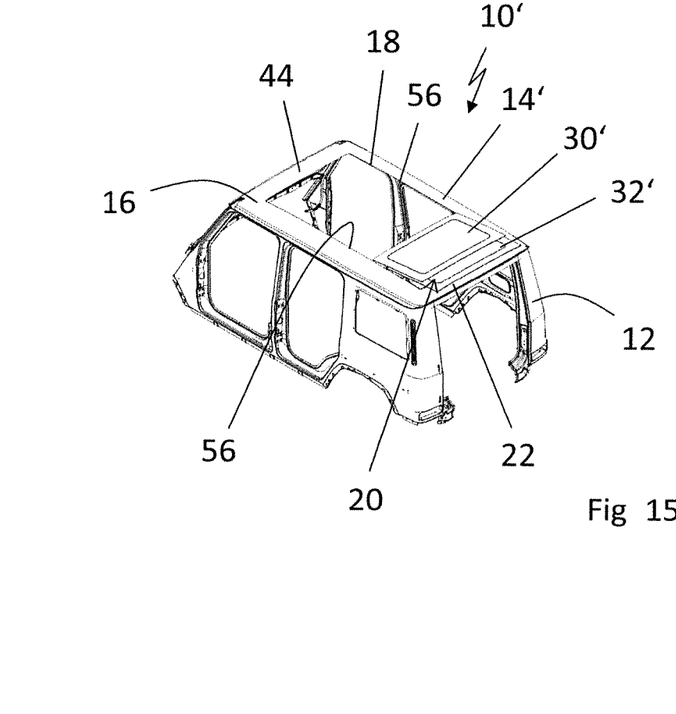
FIG. 15 illustrates a view of the vehicle construction according to FIG. 13 but in a completely opened position of the top opening system.
Figure 16:
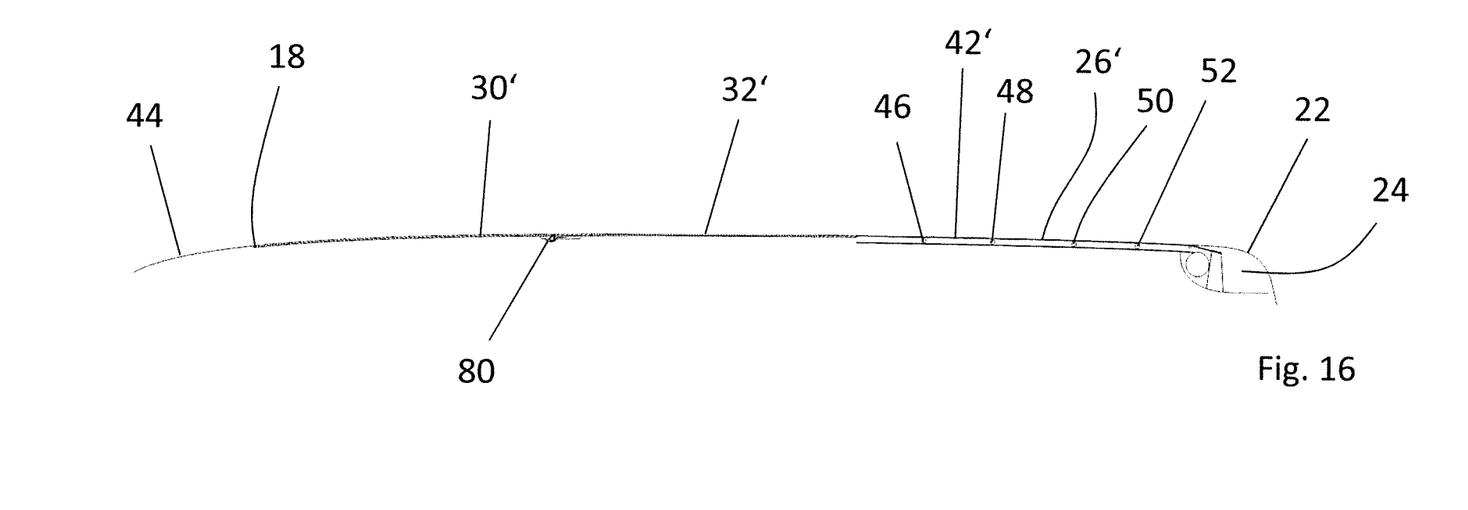
FIG. 16 illustrates a longitudinal cut through the top opening system of the vehicle construction according to FIG. 13 when in the closed position.
Figure 17:
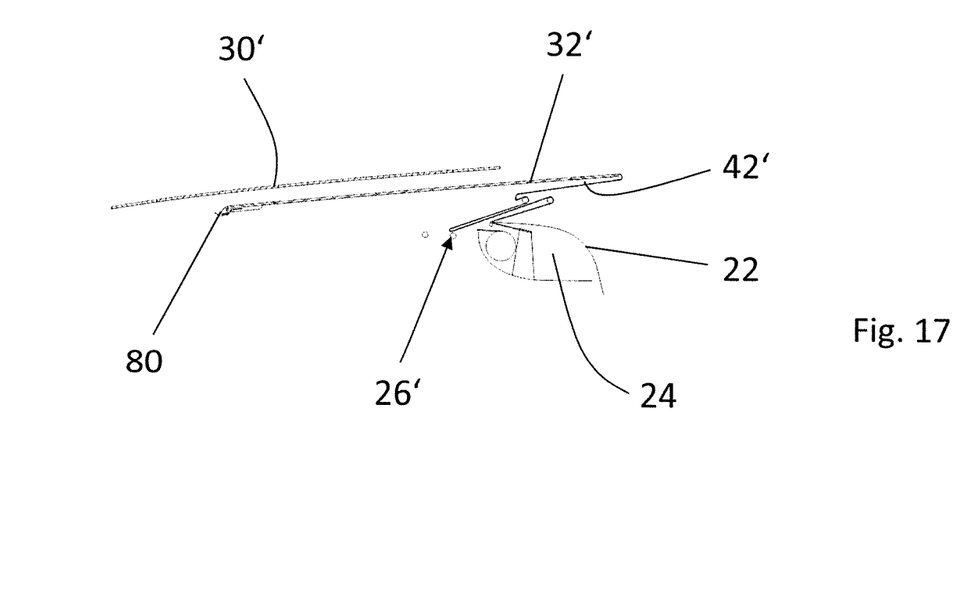
FIG. 17 illustrates a view of the top opening system according to FIG. 16 but in its completely opened position.
Figure 18:
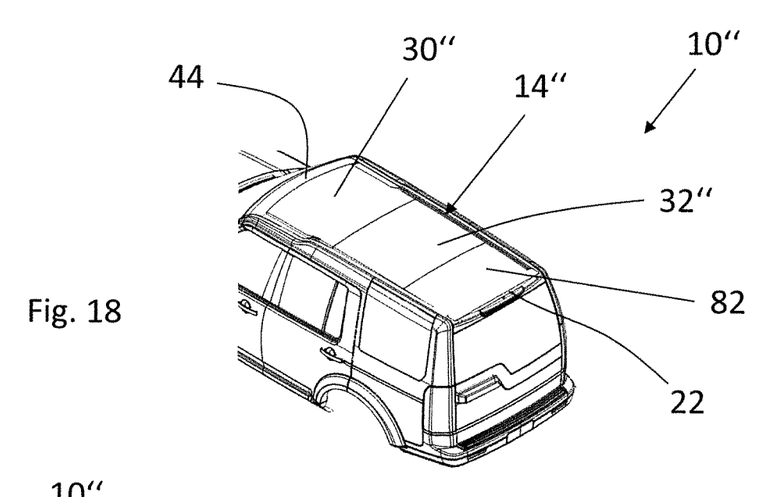
FIG. 18 illustrates a perspective top view of an alternative embodiment of a vehicle construction having a top arrangement according to the invention in a closed position of a top opening system.

Starting from the closed position illustrated in FIGS. 1, 5 and 7, the front lid element 30 is first unlocked by actuating the first motor and then raised by means of the outward-extension lever arrangement 70. A hook 71 of the outward-extension lever arrangement 70, which is connected to a drive slider 69 and locks the front lid element 30 in the closed position, is secured against pivoting back. The raising movement is guided by the four joint arrangement 66. Subsequently, the frontward lid element 30 can be displaced towards the rear by means of the drive cable driven by the first motor. A base link of the four-joint arrangement 66 is guided in the guide track 56 via the sliders 68 in this context. By actuating the second motor, the rearward lid element 32 is then displaced towards the rear and is pivoted around the pivot axis defined by the slider 78 of the support arm 76 by displacing the slider 74 of the pivot arm 72 in the allocated slotted link of the guide track 56. The bows 46, 48, 50 and 52, to which the top cover 42 is fixed, are moved towards the rear by the rear lid element 32 until the end or opened position illustrated in FIGS. 4, 6 and 12 is attained. The outward-extension bows 48 and 52 are extended outward by means of the outward-extension springs 58 and 60 so that the top cover 42 forms fabric pleats defined by the bows 46, 48, 50 and 52. In the then attained opened position, the two lid elements 30 and 32 are disposed above the folding-top section 26, said lid element 30 partially covering said lid element 32 (FIG. 12).

If the top opening system 20 is to be brought back to its closed position, the bows 46, 48, 50 and 52, which are fixed to the lid element 32, are pulled forward. For this purpose, the bows 48 and 52 are brought to a lowered position against the force of the outward-extension springs 58 and 60.

In FIGS. 13 to 17, a vehicle construction 10' is illustrated which comprises a vehicle body 12 and is provided with a top arrangement 14' essentially corresponding to the top arrangement illustrated in FIGS. 1 to 12 but differing in the respect that it comprises a top cover 42' which is only fixed to the rear element of the two lid elements 30' and 32'. The front lid element 30' is designed without fixation with regard to top cover 42'. At its front edge extending in the transverse direction of the top, the rear lid element 32' moreover comprises a seal profile 80 which seals a gap between the front lid element 30' and the rear lid element 32' in a closed position, in which a top opening 18 is entirely closed. The front lid element 30' abuts against the seal profile 80 (cf. FIG. 16).

The top arrangement 14' or rather the top opening system comprising the two lid elements 30' and 32' and the top cover 42' has a displacement kinematics which essentially corresponds to the displacement kinematics described in conjunction with the embodiment according to FIGS. 1 to 12. The front lid element 30' is therefore provided with a multi-joint kinematics on each of its two sides relative to a vertical longitudinal center plane of the top, is raised by means of said multi joint kinematics and can be shifted towards the rear above the rear lid element 32' and a folding-top section 26' formed by the top cover 42'. The rear lid element 32' is provided with a support arm on each of its two sides relative to the vertical longitudinal center plane of the top, said support arm being guided in a corresponding guide track by means of a slider as well as being connected to a pivot arm enabling pivoting the rear lid element 32' by interacting with a slotted link fixed to the guide track so that the lid element 32' can be shifted over the folding-top section 26'.

With regard to the further features of the displacement kinematics for the two lid elements 30' and 32' and for the folding-top section 26' and its bows 46, 48, 50 and 52, the foregoing embodiments as well as the embodiment according to FIGS. 1 to 12 is referred to.

In FIGS. 18 to 21, a vehicle construction 10" having another embodiment of a top arrangement 14" according to the invention is illustrated. The top arrangement 14" comprises a rearward hard-top element 82 forming a folding-top section which a top cutout 28 borders at the front, said top cutout 28 alternatively being able to be either opened or closed by means two displaceable lid elements 30" and 32". The two lid elements 30" and 32" and the hard-top element 82 are disposed behind one another in the longitudinal direction of the top in the closed position illustrated in FIGS. 18 and 20 and spanned by a continuous top cover 42". The lid elements 30" and 32" and the hard-top element 82 act like surface bows in this context and serve as an abutment surface for the top cover 42".

The lid elements 30" and 32", which are components of a top opening system, comprise a displacement kinematics essentially corresponding to the displacement kinematics of the two lid elements of the embodiment according to FIGS. 1 and 12, for which reason their description can be foregone. Indeed the description of the embodiment according to FIGS. 1 to 12 is referred to in this context.

Figure 19:
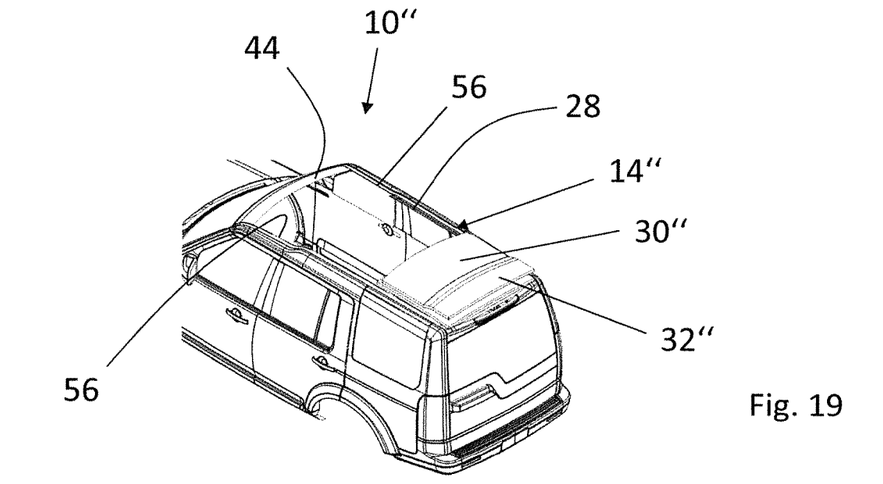
FIG. 19 illustrates a view of the vehicle construction according to FIG. 18 but in a closed position of the top opening system.
Figure 20:
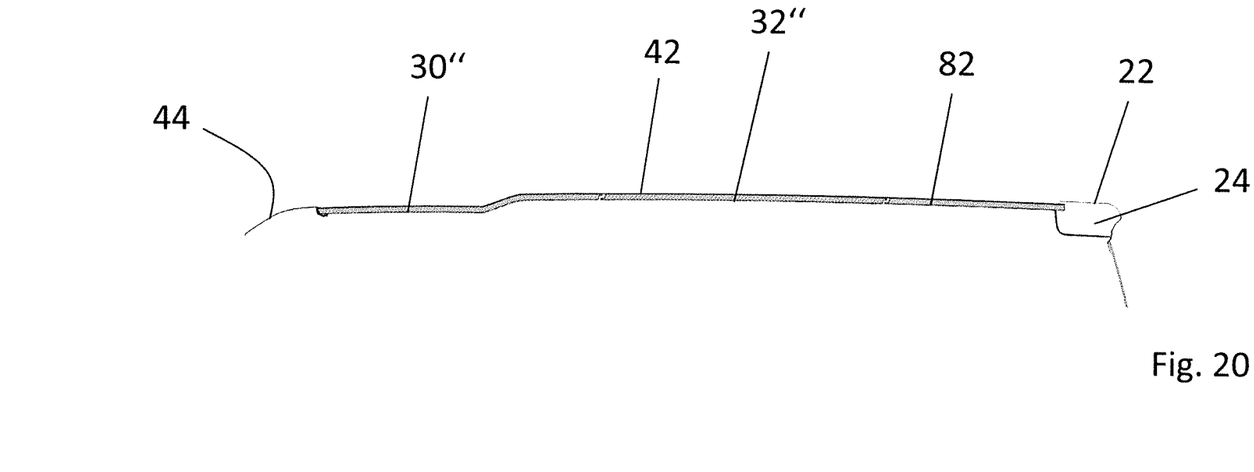
FIG. 20 illustrates a longitudinal cut through a top construction of the vehicle construction according to FIG. 18 when in the closed position of the top opening system.
Figure 21:
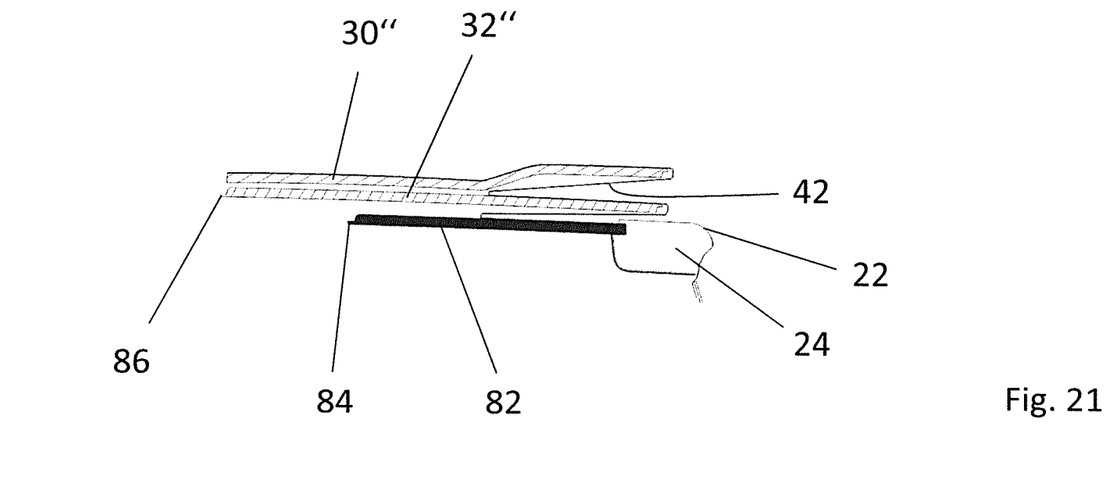
FIG. 21 illustrates a view according to claim 20 but in the opened position of the top opening system.

As can be seen in FIGS. 19 and 21, the two lid elements 30" and 32" are shifted rearward over the hard-top element 82 when opening the top cutout 28, the top cover 42" being folded, which is fixed to the upper side of the rear lid element 32" in a rearward section and in a rearward section of the hard-top element 82. In contrast, in the closed position the top cover 42" is pulled taut and spans the lid elements 30" and 32" and the hard-top element 82 entirely.

At its front edge extending in the transverse direction of the vehicle, the hard-top element 82 has a seal lip 84 against which the rear edge of the rear lid element 32" abuts in the closed position. At its front edge extending in the transverse direction of the top, the rear lid element 32" accordingly has a seal lip 86 on which the front lid element 30" rests with its rear edge in the closed position.

LIST OF REFERENCE NUMERALS

10, 10', 10" vehicle construction
12 vehicle body
14, 14', 14" top arrangement
16 edge section
18 top opening
20 top opening system
22 rearward wind cowl
24 top cassette
26, 26' folding-top section
28 top cutout
30, 30', 30" lid element
32, 32', 32" lid element
34 frame
36 frame
38 transparent area
40 transparent area
42, 42', 42" top cover
44 front wind cowl
46 bow
48 bow
50 bow
52 bow
54 slider
56 guide track
58 outward-extension spring
60 outward-extension spring
62 motor arrangement
64 drive kinematics
66 four-joint arrangement
68 slider
69 drive slider
70 outward-extension lever arrangement 71 hook
72 pivot arm
74 slider
76 support arm
78 slider
80 sealing profile
82 hard-top element
84 sealing lip
86 sealing lip

The invention claimed is:

1. A top arrangement of a motor vehicle, comprising a hard-top or a folding-top section and a top cutout which borders the hard-top or folding-top section and can be either closed or at least partially opened by means of a top opening system comprising a first displaceable lid element and a second displaceable lid element, which can be shifted over the hard-top or folding-top section, and a top cover, which spans at least the hard-top or folding-top section in a closed position of the top opening system and is fixed to the displaceable lid element across its entire width,
wherein the first displaceable lid element and second displaceable lid element are driven by a motor arrangement, and
wherein a first motor of the motor arrangement drives the first displaceable lid element and a second motor of the motor arrangement drives the second of the displaceable lid element.

2. The top arrangement according to claim 1, wherein the top cover spans the first and second displaceable lid elements.

3. The top arrangement according to claim 1, wherein first and second displaceable lid elements disposed behind one another in the closed position of the top opening system are provided and the first and second displaceable lid elements are at least partially spanned by the top cover in the closed position, the first and second displaceable lid elements being shifted over the hard-top or folding-top section in an opened position.

4. A top arrangement of a motor vehicle, comprising:
a hard-top or a folding-top section and a top cutout which borders the hard-top or folding-top section and can be either closed or at least partially opened by means of a top opening system comprising two displaceable lid elements, which can be shifted over the hard-top or folding-top section, and a top cover, which spans at least the hard-top or folding-top section in a closed position of the top opening system and is fixed to the displaceable lid element across its entire width,
wherein the two displaceable lid elements are disposed behind one another in the closed position of the top opening system and the displaceable lid element which is disposed in the front when in the closed position, is realized without fixation to the top cover the two displaceable lid elements being shifted over the hard-top or the folding-top section when in an opened position.

5. A top arrangement of a motor vehicle, comprising a hard-top or a folding-top section and a top cutout which borders the hard-top or folding-top section and can be either closed or at least partially opened by means of a top opening system comprising at least one displaceable lid element, which can be shifted over the hard-top or folding-top section, and a top cover, which spans at least the hard-top or folding-top section in a closed position of the top opening system and is fixed to the displaceable lid element across its entire width;
wherein the at least one displaceable lid element has a glass panel.

6. The top arrangement according to claim 1, wherein at least one of the first and second displaceable lid elements can be extended outward by a multi joint mechanism, which is mounted in a guide track fixed to the top, and can be shifted over the hard-top or folding-top section.

7. The top arrangement according to claim 1, wherein the first and second displaceable lid elements are disposed behind one another in the closed position of the top opening system and the displaceable lid element which is disposed in the front when in the closed position is realized without fixation to the top cover the first and second displaceable lid elements being shifted over the hard-top or the folding-top section when in an opened position.

8. The top arrangement according to claim 1, wherein at least one of the first and second displaceable lid elements has a glass panel.

9. The top arrangement according to claim 4, wherein the top cover spans the two displaceable lid elements element.

10. The top arrangement according to claim 4, wherein at least one of the two displaceable lid elements has a glass panel.

11. The top arrangement according to claim 4, wherein at least one of the two displaceable lid elements can be extended outward by a multi joint mechanism, which is mounted in a guide track fixed to the top, and can be shifted over the hard-top or folding-top section.

12. The top arrangement according to claim 5, wherein the top cover spans the at least one displaceable lid element.

13. The top arrangement according to claim 5, wherein the at least one displaceable lid element comprises two displaceable lid elements disposed behind one another in the closed position of the top opening system are provided and the two displaceable lid elements are at least partially spanned by the top cover in the closed position, the two displaceable lid elements being shifted over the hard-top or folding-top section in an opened position.

14. The top arrangement according to claim 5, wherein the at least one displaceable lid element comprises two displaceable lid elements disposed behind one another in the closed position of the top opening system and the displaceable lid element which is disposed in the front when in the closed position, is realized without fixation to the top cover the two displaceable lid elements being shifted over the hard-top or the folding-top section when in an opened position.

15. The top arrangement according to claim 5, wherein one of the at least one displaceable lid elements can be extended outward by a multi joint mechanism, which is mounted in a guide track fixed to the top, and can be shifted over the hard-top or folding-top section.

* * * * *